Patented Dec. 13, 1927.

1,652,796

UNITED STATES PATENT OFFICE.

GEORGE W. RAIZISS, OF PHILADELPHIA, AND AVENIR PROSKOURIAKOFF, OF LANSDOWNE, PENNSYLVANIA, ASSIGNORS TO ABBOTT LABORATORIES, OF CHICAGO, ILLINOIS, A CORPORATION OF ILLINOIS.

COMPOUND OF ACETYLAMINOSALICYLIC ACID WITH ALIPHATIC AMINES AND PROCESS OF MAKING SAME.

No Drawing. Application filed October 15, 1925. Serial No. 62,656.

The object of the present invention is to provide a compound having therapeutic value as a bactericide.

*General method.*

Our improved products are obtained by treating an acetylaminosalicylic acid with an alcohol solution of an aliphatic amine. The mixture is added to ether and the precipitated material is filtered off and dried.

The obtained products are water soluble and usually quite well defined crystalline bodies possessing in vivo a marked bactericidal power and can be employed for many therapeutic purposes. In the following examples, we describe products prepared from 5-acetylaminosalicylic acid which we have found should be of high grade and chemically pure in order to secure the best results.

*Example 1.*

3.5 grams of N-propylamine is dissolved in 50 c. c. of methyl alcohol. To this solution are gradually added 12 grams of 5-acetylaminosalicylic acid. The entire liquid is slowly filtered into 800 c. c. of ether. On stirring a white crystalline substance precipitates. It is filtered off, washed several times with ether and dried. The product is easily soluble in water and alcohol.

This material is represented by the formula

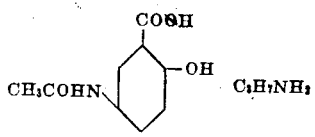

*Example 2.*

102 grams of pure 5-acetylaminosalicylic acid are dissolved in 1000 c. c. of methyl alcohol and filtered through a paper filter. 70 grams of pure hexamethylenetetramine are dissolved in 1000 c. c. of methyl alcohol and likewise filtered. The alcoholic solutions of both products are mixed together. A thick, white, solid crystallizes. To this are added about 1500 c. c. of U. S. P. ether and the whole mixed thoroughly. The solid is separated from the ether and alcohol by filtration by suction in porcelain or earthenware funnels. It is then thoroughly pressed out in the funnel and washed several times with U. S. P. ether. It is dried in vacuo over caustic soda for several days until it is perfectly dry and free from any odor of ether or alcohol. This compound is represented by the formula

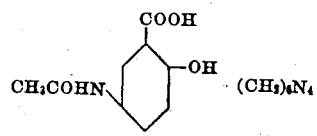

The last named product which is a compound of 5-acetylaminosalicylic acid and hexamethylenetetramine is a useful urinary antiseptic and may be used also as an analgesic and antipyretic being less toxic than sodium salicylate.

The scope of the invention should be determined by reference to the appended claims, said claims being construed as broadly as possible, consistent with the state of the art.

We claim as our invention:

1. As a new article of manufacture, an acetylaminosalicylic acid combined with an aliphatic amine.

2. As a new article of manufacture, 5-acetylaminosalicylic acid combined with an aliphatic amine.

3. As a new article of manufacture, an acetylaminosalicylic acid combined with hexamethylenetetramine.

4. As a new article of manufacture, a compound formed by combining 5-acetylaminosalicylic acid with hexamethylenetetramine.

5. The improved method of preparing an article for the purpose described which consists in treating an acetylaminosalicylic acid with an alcoholic solution of an aliphatic amine and then precipitating the resulting product.

6. The improved process of preparing a body of the class described which consists in treating an acetylaminosalicylic acid with a methyl alcohol solution of an aliphatic amine and then precipitating the product.

7. The improved process of preparing a body of the class described which consists in treating 5-acetylaminosalicylic acid with a methyl alcohol solution of an aliphatic amine and then precipitating the product with ether.

8. The improvement in the method of preparing a product of the class described which consists in preparing a solution of 5-acetylaminosalicylic acid in methyl alcohol, mixing therewith a methyl alcohol solution of hexamethylenetetramine, washing and drying.

GEORGE W. RAIZISS.
AVENIR PROSKOURIAKOFF.